W. H. McLAUGHLIN.
ANTISKIDDING DEVICE.
APPLICATION FILED MAR. 30, 1917.
1,240,465.
Patented Sept. 18, 1917.
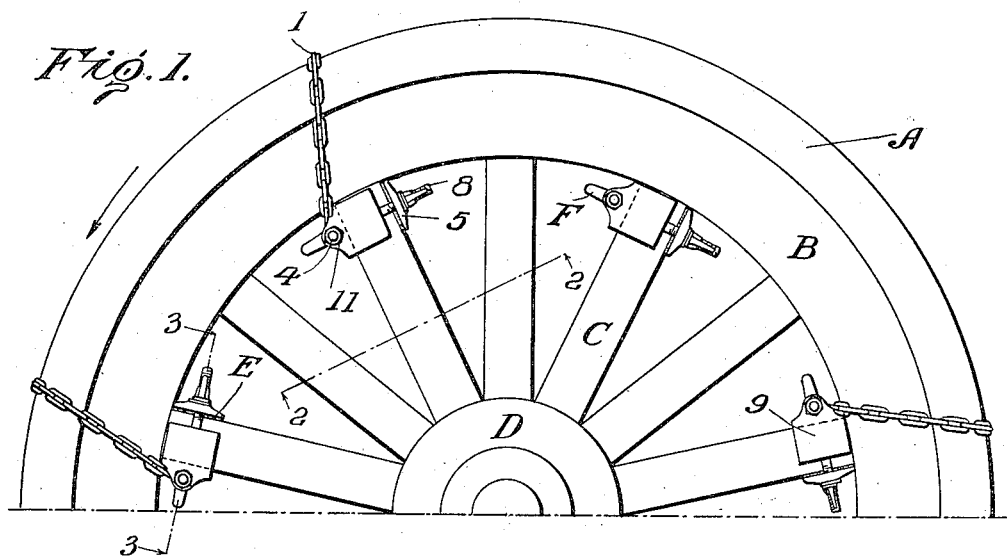
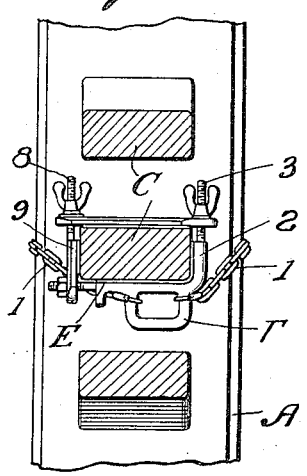
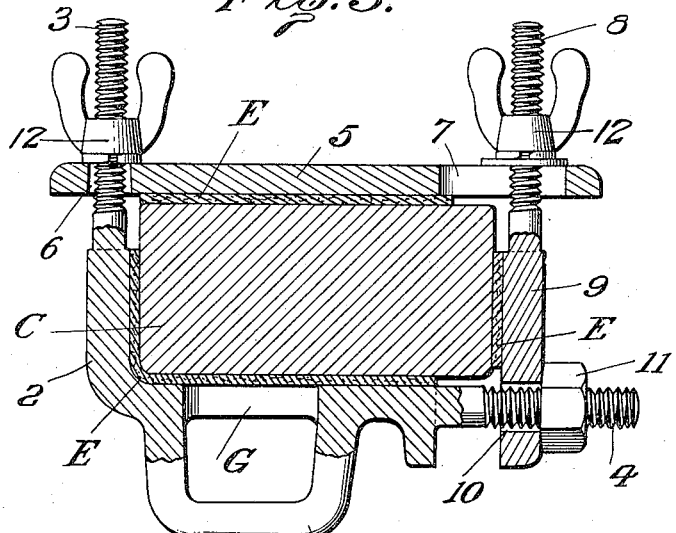
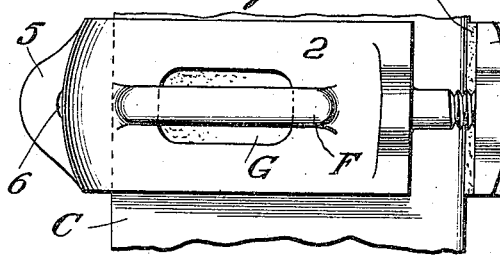
Inventor
William H. McLaughlin
By Wm. H. Babcock & Son
Attorneys

UNITED STATES PATENT OFFICE.

WILLIAM H. McLAUGHLIN, OF HARTFORD, CONNECTICUT, ASSIGNOR TO CASSIUS S. CHASE, OF HARTFORD, CONNECTICUT.

ANTISKIDDING DEVICE.

1,240,465.  Specification of Letters Patent.  Patented Sept. 18, 1917.

Application filed March 30, 1917. Serial No. 158,544.

*To all whom it may concern:*

Be it known that I, WILLIAM H. MCLAUGHLIN, a citizen of the United States, residing at Hartford, in the county of Hartford and State of Connecticut, have invented certain new and useful Improvements in Antiskidding Devices, of which the following is a specification.

This invention relates to anti-skidding devices of the fixed point type to be used in combination with vehicle wheels, more particularly to that class of such devices employing clamping plates fitting around the spokes of the wheel and carrying an eye between the spokes to receive separable connections or connectors secured to the ends of anti-skid chains passing around the tire, as described in my application Serial Number 138,174, series of 1915, now pending in the Patent Office.

The primary object of the present invention has relation to the clamp for such use more particularly with a spoke which is quadrilateral in cross-section and is to provide such a clamp for such a spoke which will fit any one of a number of such spokes of varying sizes and is therefore adjustable to fit the spokes of wheels of heavy trucks through a wide range.

In the accompanying drawings:

Figure 1 represents a side elevation of a segment of a wheel provided with anti-skidding devices embodying my invention, one of the gripping or anti-skidding chains being omitted;

Fig. 2, a section on line 2—2 of Fig. 1;

Fig. 3, a section on line 3—3 of Fig. 1, greatly enlarged; and

Fig. 4, a front elevation of one of the clamps as applied to a spoke, which is broken away.

Referring now in detail to the drawings A designates the tire, B the felly, C the spokes and D the hub.

The short anti-skid chains 1 are adapted to be attached to the alternate spokes of the wheel by means of a clamp having an L-shaped member 2 provided on each end with integral cylindrical externally screw-threaded parts or integral bolts 3 and 4, a rear member 5, in assembled position paralleling the long member of part or plate 2 and provided near one end with a hole 6 receiving screw-threaded part 3 of member or plate 2 and in its other end with a longitudinal slot 7 receiving the cylindrical externally screw-threaded part of bolt 8 of end member or plate 9, which has its other end portion provided with a hole 10 to receive the screw-threaded part or integral bolt 4 of member or plate 2.

The inner gripping faces of these plates are provided with suitable frictional gripping material E, which insures a good grip on the spokes while preventing marring thereof.

The plate or member 2 is provided on its longer part with an integral elongated U-shaped eye F, the material of the plate 2 between the ends of this eye F and on either side of it being cut out or eliminated to form an opening or recess G.

Its application to a spoke of the shape stated is obvious, the slot 7 of plate 5 allowing side member or plate 9 with its bolt 8 to move laterally with relation to the spoke and independently of plate 5 and the nut 11 turning on bolt 4 and wing nuts 12 turning on bolts 3 and 8 will hold all parts firmly together, at the same time allowing plenty of adjustability. Preferably a disk washer will be slipped over the end of bolt 8 first so as to rest on the face of plate 5 adjacent the slot 7, after which split or spring washers will be passed over the ends of bolts 3 and 8, and then the nuts 12 will be turned home.

Ordinarily these clamps will remain applied to the wheel spokes in all kinds of weather, it then being simple to attach the chains 1 to the eyes F by any suitable snap-hooks or other means. Also, the eyes F will, preferably, be arranged on the front of the spoke in the direction of rotation of the wheel.

Having thus described my invention, what I claim as new and desire to secure by Letters Patent is:

1. An adjustable clamp comprising a front plate extending in two directions and having its ends provided with externally screw-threaded parts, a side plate having a perforation near one end to receive one of said screw-threaded parts, its other end being provided with an externally screw-threaded part, and a rear plate provided near one end with a hole to receive the other screw-threaded part of the front plate and provided near its other end with a longitudinal slot adapted to receive at any point the screw-threaded part of said side plate, and nuts turning on said screw-threaded parts to hold said plates in assembled and adjusted position.

2. An adjustable clamp comprising a front plate extending in two directions and having its ends provided with externally screw-threaded parts, a side plate having a perforation near one end to receive one of said screw-threaded parts, its other end being provided with an externally screw-threaded part, and a rear plate provided near one end with a hole to receive the other screw-threaded part of the front plate and provided near its other end with a longitudinal slot adapted to receive at any point the screw-threaded part of said side plate, a washer fitting over the screw-threaded part of the side plate and bearing on the face of the rear plate adjacent to said slot, and nuts turning on said screw-threaded parts to hold said plates in assembled and adjusted position.

3. An adjustable clamp comprising a front plate having its ends provided with externally screw-threaded parts, a side plate having a perforation near one end to receive one of said screw-threaded parts, its other end being provided with an externally screw-threaded part, and a rear plate provided near one end with a hole to receive the other screw-threaded part of the front plate and provided near its other end with a longitudinal slot adapted to receive at any point the screw-threaded part of said side plate, and nuts turning on said screw-threaded parts to hold said plates in assembled and adjusted position.

4. An adjustable clamp comprising a front plate, a rear plate provided with a longitudinal slot near one end and a side plate adapted to be adjustably connected at one end to said front plate and having a part projecting through said slot, in combination with means traveling on said part to lock it in any such adjusted position and to also move the rear plate toward the front plate and lock it against movement therefrom, and means for adjusting the position of the other end of the rear plate with the view of holding said front and rear plates parallel to each other for the purpose set forth.

5. A clamp comprising three plates, one of which is provided with a hole near one end and a slot near the other, another being provided with a hole near one end and a screw-threaded part connected to its other end and extending through the slot of the first mentioned plate, the third plate being provided on both ends with screw-threaded parts extending respectively through the holes of the first and second mentioned plates, and nuts turning on said screw-threaded parts for the purpose set forth.

In testimony whereof, I have signed my name to this specification in the presence of two subscribing witnesses.

WILLIAM H. McLAUGHLIN.

Witnesses:
   E. J. MARKHAM,
   E. S. KANE.

Copies of this patent may be obtained for five cents each, by addressing the "Commissioner of Patents, Washington, D. C."